Patented Aug. 18, 1925.

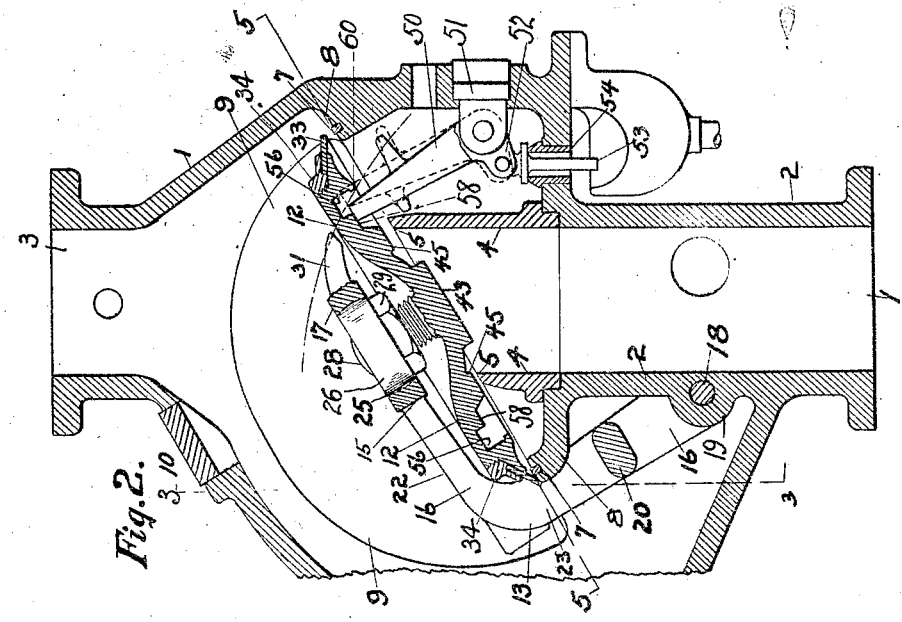

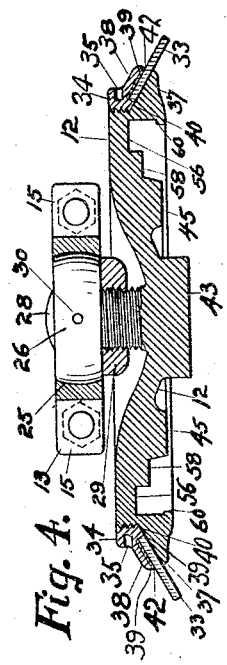

1,549,764

UNITED STATES PATENT OFFICE.

WILLIAM B. GRIFFITH, OF CAMDEN, NEW JERSEY, ASSIGNOR TO STAR SPRINKLER CORPORATION, A CORPORATION OF NEW JERSEY.

DRY-PIPE VALVE.

Application filed April 4, 1921. Serial No. 458,301.

*To all whom it may concern:*

Be it known that I, WILLIAM B. GRIFFITH, a citizen of the United States, residing at Camden, in the county of Camden and State of New Jersey, have invented certain new and useful Improvements in a Dry-Pipe Valve, of which the following is a specification.

My invention relates to improvements in a dry pipe valve. The invention comprises a valve for sprinkler systems having an air valve and a water valve of relatively smaller area than the air valve, so that a low air pressure confined in the system will hold the water valve closed against a higher water pressure; and, when the air pressure is relieved by the opening of a sprinkler head, the valve will open and allow the water to flow through the system. Valves of this general type are well known in the art.

The object of my invention is to construct a valve in which the movable members of the valve mechanism will offer a minimum amount of resistance to the opening operation of the valve; a further object of my invention is to provide a unit valve clapper, constructed with the air and water valves in the same plane and the clapper positioned at an oblique angle in relation to the direction of the flow of water through the supply pipe, and by mounting the clapper upon an arm or frame which is pivotally mounted adjacent to the center of gravity of the clapper, thus mounting the clapper in nearly a balanced position when the valve is closed; a still further object of my invention is to construct an angular valve seat on the water supply pipe without diverting the flow of water from the straight line of flow in relation to the length of the water pipe, and by providing a facing surface upon the clapper of sufficient width to close the elliptical valve seat thus provided upon the cylindrical water pipe, so that the clapper will properly seat without the necessity of bringing it to any particular radial position in relation to the rotatable bearing connecting the clapper and the frame; a still further object of my invention is to provide a novel means for holding the air valve or gasket upon the clapper by providing an annular threaded collar for clamping the gasket upon the clapper; a still further object of my invention is to provide a connecting means between the clapper and the frame having a universal movement; and a still further object of my invention is to provide a pivoted latch for holding the clapper from reseating after the valve starts to open, wherein said latch is moved into the engaging position by a positive movement imparted by the opening movement of the clapper. These, together with various novel features of construction and arrangement of the parts constitute my invention, which will be more fully hereinafter described and claimed.

Referring to the accompanying drawing: Fig. 1, is a vertical sectional view of a dry pipe valve showing my invention embodied therein; Fig. 2, is a partial view similar to Fig. 1, showing the valve clapper in a different position; Fig. 3, is a partial vertical section on line 3—3, Fig. 1, showing the frame for carrying the clapper, (the clapper being omitted), illustrating how the frame is pivotally mounted upon widely separated bearings to insure against lateral movement of the frame; Fig. 4, is an enlarged sectional view of the valve clapper, showing the universal connecting bearing between the frame and the clapper, and also showing the threaded collar for clamping the air valve gasket, or valve ring; and Fig. 5, is a sectional view taken on line 5—5 Fig. 1.

In the accompanying drawings, in which like reference characters refer to like parts, 1 represents the valve body or casing provided with a water supply pipe 2 and an outlet pipe 3. Said pipes having suitable flanges thereon for making pipe connection.

The water supply pipe 2 extends into the interior of the casing 1, and it may be provided with a detachable section 4, forming a cylindrical outlet member aligning with the cylindrical water supply pipe 2, and forming the water valve seat 5, which latter is positioned on a plane extending at an oblique angle with relation to the longitudinal axis of the cylindrical supply pipe 2. The annular air valve seat 7 is formed upon the flange 8, forming part of the casing 1. The air valve seat 7 is positioned in the same plane as the water valve seat 5, and is of circular formation, whereas the water valve seat 5 presents an elliptical formation on the plane of the valve seats 5 and 7.

The casing 1 is provided with a removable side plate 9 for closing a hand hole formed in the casing 1, and the casing is also provided with a plugged opening 10 formed therein to facilitate in forming the facing surfaces of the valve seats.

The valve clapper 12 is carried upon a pivoted frame 13 of rigid construction, comprising a head 15 in which the clapper is universally mounted and two side arms 16 extending from the said head, at opposite sides thereof, and spaced a sufficient distance apart to straddle the supply pipe 2, as shown in Fig. 3. The ends of the arms 16 are pivoted upon a shaft 18, which in turn is mounted in bearings 19 preferably formed upon the water supply pipe 2. The side arms 16 of the frame 13 are connected by a cross member 20, as shown in Figs. 1 and 3, which makes the frame 13 rigid in construction. The great distance between the arms 16 at the points where they are pivoted insures the frame against any lateral movement, and also against twisting strain due to the weight of the clapper 12, upon the frame, during the swinging of the frame upon its pivot 18, to carry the clapper in the opening and closing movements.

By separating the arms 16 of the pivoted frame 13, so that they may straddle the supply pipe 2, the pivot bearings 19 may be positioned nearly under the center of gravity of the clapper 12 and the pivoted frame 13, so that a very slight excess of pressure below the clapper 12 will lift the clapper sufficiently to overbalance and cause the weight of the clapper and the frame to swing said parts into the open position and allow the water to flow through the supply pipe 2 and the valve outlet 3 of the casing.

The arms 16 of the frame 13 are of L-shaped formation, as shown in Fig. 1, and the member 22 of an arm 16 is about the same length as the member 23 of said arm, which permits the pivot point 18 of the frame 13 to be located a sufficient distance from the clapper 12, so that the latter will move through an arc having a long radius. The initial movement of the clapper will be through the top portion of the arc of the circle of rotation; and, therefore, the center of gravity of the parts will move nearly in a horizontal line, and the moving parts will require only a slight upward or lifting force to open the valve. This advantage is facilitated by the clapper 12 having both the air and water valves arranged thereon in the same plane positioned obliquely, and also in the fact that the clapper is located high above and nearly over the pivot point of the frame carrying the clapper.

The clapper 12 is universally mounted in the bearing head 15 formed upon the upper portion of the pivoted frame 13. The said bearing head has formed therein a spherical recess 25, in which is loosely mounted a nut 26 having a corresponding spherical surface, and thus forming a universal joint. The ball shaped nut 26 is threaded upon the screw stem 28 forming part of the clapper 12. A lock nut 29 is provided upon the screw stem for impinging against the ball nut 26, after proper adjustments have been made between the clapper and the frame 13 for seating the clapper upon the valve seats. After the ball nut 26 is adjusted to its proper position the retaining plate 17, of the split head 15, is removed and a hole is bored through the ball nut 26 and the screw stem 28 for the insertion of a securing pin 30, and the parts are then reassembled.

The retaining plate 17 has a lug 31 formed thereon which forms a stop to limit the movement of the clapper 12. The opposite movement of the clapper is limited by the arms 16 of the frame 13. The clapper 12 is thus free to rock slightly upon the ball nut 26 which forms a universal connection with the pivoted frame 13 and thus allows the clapper to seat perfectly upon the valve seats. The ball nut 26 also permits the clapper to rotate upon its own axis in alignment with the screw stem 28.

The air valve seat is closed by a removable valve ring 33, preferably made of rubber, which is mounted upon the periphery of the clapper 12 and secured thereon by a clamp ring 34, which is constructed in a novel manner. The clamp ring 34 is provided with a screw thread upon its inner cylindrical surface and the cylindrical surface of the clapper 12 is also provided with a screw thread to receive the clamp ring 34. The clamp ring 34 is provided with notches 35, see Fig. 4, to receive a spanner wrench for screwing the clamp ring 34 upon the clapper 12 and thus clamp the inner portion of the valve ring 33 between the flange 37 formed on the clapper and the flange 38, formed on the clamp ring.

The clamp ring 34 has formed therein a recess 39 to receive the valve ring 33 and a shoulder 40 is thus formed upon the clamp ring 34 at the inner edge of said recess 39. Said shoulder 40 is adapted to take against the flange 37 and prevent too great a pressure being placed upon the rubber valve ring 33. A washer 42 may be interposed between the valve ring 33 and the clamp ring flange 38 to facilitate in separating the said parts. The clapper 12 is provided upon its under side with a projecting lug 43, positioned centrally, which is of rectangular formation, as shown in Fig. 5, and adapted to be used for clamping the clapper in a vise when the clamp ring 34 is being screwed upon the clapper, to renew the valve ring.

The facing surface 45 of the clapper 12 which rests upon the water valve seat 5, is concentric with the clapper, as shown in Fig. 5, and said facing surface 45 is of sufficient width to properly cover the water valve seat 5, which is of elliptical formation due to the fact that the supply pipe 2 is cylindrical and the valve seat 5 formed thereon extends in a plane positioned obliquely to the longitudinal axis of the cylindrical pipe 2. By this construction the clapper 12 may be positioned obliquely to facilitate in the opening movement thereof and the discharge end of the supply pipe 2 is cylindrical adjacent to the water valve seat 5, whereby a straight flow of water is obtained through the valve when the clapper is opened. Heretofore valves having the clapper positioned obliquely have been made with a curve, or elbow, in the supply pipe adjacent to the water valve seat, thereby obstructing and diverting the flow of water out of its straight course through the valve casing.

A latch 50 is provided for holding the clapper 12 open, or from reseating after it starts to open. The latch 50 is pivotally mounted in a bearing 51 secured in the casing 1. Said latch has an arm 52, to which is pivotally connected a valve stem 53, adapted to open and close the drip valve seat 54.

The free end of the latch 50 is engaged by the clapper 12 which normally holds the latch in a position to keep the drip valve 54 open when the clapper is in the closed position, as shown in Fig. 1.

The clapper 12 is provided with an annular recess 56 adapted to receive the free end of the latch 50. The point of the latch 50 fits loosely into said recess 56, so that the clapper will seat properly upon the valve seats 5 and 7. Upon the under side of the clapper 12 is a shoulder 58 positioned adjacent to the said annular recess 56. Said shoulder 58 is of sufficient height to hold the clapper off the valve seats when the latch 50 is moved into the position, shown in full lines in Fig. 2, in which position the shoulder 58 rests upon the end of the latch 50.

Heretofore latches have been provided for preventing the clapper from reseating after it starts to open, but such latches depended upon gravity to move them into engagement with the clapper. The novel feature of the present latch is, that it is actuated by the opening movement of the clapper, and thus has a positive action.

The latch 50 is so positioned in relation to the clapper 12 that the wall 60 of the clapper, adjacent to the said recess 56 occupied by the latch, will act as a cam and strike the end of the latch when the clapper 12 starts to open, or move off the valve seats, and the latch 50 will thus be moved into a position which will be in line with the circle of rotation of said shoulder 58 on the clapper, as the latter moves around the center 18, and should the clapper action be reversed, tending to reseat the clapper the shoulder 58 will rest upon the end of the latch and thus hold the clapper off the seats sufficiently to prevent the valve being held closed by a difference of pressure above and below the clapper.

Figs. 1 and 2 clearly show the movements of the parts; the circular dot and dash line shows the radius, or arc, described by the wall or actuating cam 60, formed on the clapper. The opening movement of the clapper forces the latch 50 from the position shown in Fig. 1, and in dotted lines Fig. 2, into the position shown in full lines in Fig. 2. In Fig. 1, the point of the latch is shown to be normally positioned at a greater radius from the center of rotation 18 of the clapper in its opening movement, than the radius of wall or cam 60, and Fig. 2, shows that the wall or cam 60, in the opening movement of the clapper, will force the point of the latch 50 into a position closer to the center of rotation of the clapper and leave the point of the latch in a position in the line of rotation of the shoulder 58 on the clapper, which will hold the clapper off the valve seats and the latch valve 53 in a position to close the drip valve seat 54.

When the parts are being assembled, the latch 50 may be lifted by the valve stem 53 of the drip valve and the free end of the latch moved into a position to enter the annular recess 56 formed in the clapper. The latch is provided with lugs 63 and 64 to limit its movement. The latch 50 carrying the arm 52 is so hung in the bearing 51 that its own weight will move the latch into the desired position when the clapper 12 is lifted off its seats. But gravity can not be depended upon to cause the latch to function, as the parts may become corroded and stick, unless a positive action, as above described, is imparted to the latch.

Having thus described my invention, I claim and desire to secure by Letters Patent:

1. In a dry pipe valve, a casing having an outlet passage, an inlet pipe provided with an elliptical valve seat positioned obliquely in relation to the longitudinal axis of said pipe, a valve member, a member movably mounted within the casing upon which the valve member is rotatably mounted, and a facing surface upon the valve member of sufficient width to close the said elliptical valve seat when the valve member is rotated into any axial position upon said member carrying the same.

2. In a dry pipe valve, a casing having an outlet passage, an inlet pipe provided with an elliptical valve seat positioned obliquely in relation to the longitudinal axis of said pipe, a valve member, a member movably mounted within the casing upon which the valve member is rotatably mounted, and a circular facing surface upon the valve member having sufficient area to cover said elliptical valve seat and close the inlet pipe in all radial positions of the valve member.

3. In a dry pipe valve, a casing having an outlet passage and an inlet passage provided with a valve seat surrounding the latter, a valve clapper having a contact surface for closing said seat adapted to be moved through a given path into the opened and closed positions of the valve, a part normally positioned to allow the clapper to rest upon the valve seat and adapted to be moved into the path of the clapper and hold the latter off the valve seat, and said clapper and said part having cooperating portions for positively moving the said part, by the action of the clapper in its opening movement, into the path of the clapper and prevent its reseating.

4. In a dry pipe valve, a casing having an outlet passage and an inlet passage provided with a valve seat surrounding the latter, a valve clapper having a contact surface adapted to engage said seat, a member upon which the clapper is carried into the closed and open positions in relation to said seat, a part movably supported within the casing, and normally held in a position to allow the clapper to engage said seat, and a cam upon the clapper adapted to engage said part when the clapper is lifted from the said seat and force the said part into a position to prevent the clapper from reseating upon said seat in the event of a return movement of the clapper in the direction of said seat.

5. In a dry pipe valve, a casing having an outlet passage and an inlet passage provided with a valve seat surrounding the latter, a valve clapper having a contact surface adapted to engage said seat, a member upon which the clapper is carried into the closed and open positions in relation to said seat, a latch pivotally mounted within the casing, said clapper having a recess formed therein into which the free end of the latch loosely fits when the clapper is seated, and a member upon the clapper adapted to engage the latch in the opening movement of the clapper, whereby the clapper will force the latch into a position to engage the clapper and prevent it from reseating in the event of a return movement of the clapper in the direction of the said seat.

6. In a dry pipe valve, a casing having an outlet passage and an inlet passage provided with a valve seat surrounding the latter, a valve clapper having a contact surface adapted to engage said seat, a member upon which the clapper is carried into the closed and open positions in relation to said seat, a latch pivotally mounted within the casing, said clapper having a recess formed therein into which the free end of the latch loosely fits when the clapper is closed upon said seat, a wall upon the clapper adjacent to said recess forming a cam adapted to engage the latch, the free end of the latch being positioned when occupying the said recess so as to extend across the path through which said cam moves when the clapper is lifted off its seat, and a shoulder upon the clapper adjacent to the said recess of less height than the wall forming said cam to permit the latch to be forced by the cam into the path through which the shoulder has passed and occupy a position to be engaged by the shoulder in the event of a return movement of the clapper towards the said seat, and thus preventing the clapper from reseating.

7. In a dry pipe valve, a casing having an outlet passage and an inlet passage provided with a valve seat surrounding the latter, a valve clapper having a contact surface adapted to engage said seat, a member upon which the clapper is carried into the closed and open positions in relation to said seat, means for rotatably mounting the clapper upon said member, said clapper having an annular recess formed therein, a latch pivotally mounted within the casing and having its free end normally projecting into said recess in the clapper when the latter is closed upon said seat, an annular wall forming a cam surface upon the clapper adapted to engage the latch and force it out of alignment with said recess in the clapper by the movement of the clapper in the direction of opening the valve, and a shoulder upon the clapper adapted to take against the latch and hold the clapper off said seat when said latch is positioned out of alignment with the said recess formed in the clapper.

8. In a dry pipe valve, a casing having an outlet passage and an inlet passage provided with a valve seat surrounding the latter, a valve clapper having a contact surface adapted to engage said seat, a member upon which the clapper is carried into the closed and open positions in relation to said seat, means for rotatably mounting the clapper upon said member, said clapper having an annular recess formed therein, a latch pivotally mounted within the casing, and having its free end normally projecting into the said annular recess in the clapper when the latter is closed upon said seat, a drip valve in said casing adapted to be held open when the latch is in the said normal position, a cam surface upon the clapper adapted to force the latch into a position to close the drip valve when the clapper is lifted from said seat, and a shoulder upon the clapper adapted to be engaged by the latch and hold the clapper off said seat in the event of a reverse movement of the clapper toward said seat.

9. In a dry pipe valve, a casing having an outlet passage and an inlet passage; a valve clapper movable from and to a position closing the inlet passage, a normally open drip valve in said casing and co-operating parts upon the valve clapper and the drip valve by which the valve clapper is adapted to positively move the drip valve to its closed position when the valve clapper is moved from its closed position.

10. In a dry pipe valve, a casing having an outlet passage and an inlet passage, a valve clapper movable from and to a position closing the inlet passage, a part pivoted within the casing, and a normally open drip valve connected to said part, and movable thereby to and from a closed position, said valve clapper and said part having co-operating parts causing the valve clapper to positively move said part and thereby move the drip valve to its closed position when the valve clapper is moved from its closed position.

11. In a dry pipe valve, a casing having an outlet passage and an inlet passage, a valve clapper movable, from and to a position closing the inlet passage, a part pivoted within the casing, and a normally open drip valve connected to said part and movable thereby to and from a closed position, said valve clapper and said part having co-operating parts causing the valve clapper to positively move said part and thereby move the drip valve to its closed position when the valve clapper is moved from its closed position, said part, after being moved by the valve clapper to close the drip valve, being in a position to be engaged by the valve clapper and prevent its return to its closed position.

In testimony whereof I affix my signature.

WILLIAM B. GRIFFITH.